(12) United States Patent
    Foster

(10) Patent No.: US 9,971,714 B2
(45) Date of Patent: May 15, 2018

(54) DEVICE INTERFACING

(71) Applicant: Yahoo!, Inc., Sunnyvale, CA (US)

(72) Inventor: Andrew Foster, Omaha, NE (US)

(73) Assignee: OATH INC., New York, NY (US)

( * ) Notice: Subject to any disclaimer, the term of this patent is extended or adjusted under 35 U.S.C. 154(b) by 209 days.

(21) Appl. No.: 14/704,405

(22) Filed: May 5, 2015

(65) Prior Publication Data
    US 2016/0328343 A1   Nov. 10, 2016

(51) Int. Cl.
    *G06F 13/00*   (2006.01)
    *G06F 11/00*   (2006.01)
    *G06F 12/14*   (2006.01)
    *G06F 12/16*   (2006.01)
    *G08B 23/00*   (2006.01)
    *H05K 7/10*    (2006.01)
    *G06F 13/36*   (2006.01)
    *G06F 13/40*   (2006.01)

(52) U.S. Cl.
    CPC .......... *G06F 13/36* (2013.01); *G06F 13/4068* (2013.01)

(58) Field of Classification Search
    CPC .............. G06F 17/30985; G06F 21/34; H04L 63/1408; H04L 63/1416
    USPC .............. 710/104, 302; 726/22; 707/E17, 39
    See application file for complete search history.

(56) References Cited

U.S. PATENT DOCUMENTS

| | | | | |
|---|---|---|---|---|
| 5,757,983 A * | 5/1998 | Kawaguchi | ....... | G06F 17/30675 382/218 |
| 5,794,239 A * | 8/1998 | Walster | ............. | G06F 17/30985 |
| 6,647,453 B1 * | 11/2003 | Duncan | ............... | G06F 12/0835 710/100 |
| 8,042,184 B1 * | 10/2011 | Batenin | ................. | G06F 21/566 711/100 |
| 8,171,554 B2 * | 5/2012 | Elovici | ................. | H04L 41/147 713/151 |
| 8,490,148 B2 * | 7/2013 | Sikka | .................... | H04L 63/102 715/700 |
| 8,516,588 B1 * | 8/2013 | Kight | .................. | H04L 63/1416 380/265 |
| 8,843,399 B1 * | 9/2014 | Eakin | ..................... | G06Q 10/10 705/26.35 |
| 2003/0053603 A1 * | 3/2003 | Vejlgaard | ................ | H04L 12/66 379/52 |

(Continued)

*Primary Examiner* — Faisal M Zaman
(74) *Attorney, Agent, or Firm* — Cooper Legal Group, LLC

(57) ABSTRACT

Many devices may comprise interfaces, such as serial interfaces, over which configuration and/or enablement/disablement of device features may be provided to the device. Connecting a computer to individual devices for manual configuration may be cumbersome and/or time consuming. Accordingly, as provided herein, a device interfacing component (e.g., a microcontroller integrated into an interface cable) is configured to couple to a target device. The device interfacing component may receive data streams from the target device, and may match strings, within the data streams, to expressions. If a string matches an expression (e.g., "F5 for IP setup"), then a corresponding scripted response may be executed to send a response instruction (F5, wait 10 seconds, enter key, "192.168.0.1") to the target device. In this way, the device interfacing component may provide automated configuration for the target device and/or may be daisy chained with other device interfacing components for configuration of other target devices.

19 Claims, 12 Drawing Sheets

(56) References Cited

U.S. PATENT DOCUMENTS

| | | | | |
|---|---|---|---|---|
| 2003/0140140 A1* | 7/2003 | Lahtinen | H04L 41/28 | 709/224 |
| 2003/0145228 A1* | 7/2003 | Suuronen | H04L 63/0227 | 726/12 |
| 2004/0268147 A1* | 12/2004 | Wiederin | G06F 21/567 | 726/12 |
| 2007/0089171 A1* | 4/2007 | Aharon | G06F 21/55 | 726/22 |
| 2007/0101427 A1* | 5/2007 | Toomey | G06F 21/57 | 726/22 |
| 2007/0179935 A1* | 8/2007 | Lee | G06F 17/30516 | |
| 2008/0219261 A1* | 9/2008 | Lin | H04L 63/145 | 370/392 |
| 2009/0007266 A1* | 1/2009 | Wu | H04L 63/1425 | 726/22 |
| 2009/0222877 A1* | 9/2009 | Diehl | H04L 63/0263 | 726/1 |
| 2010/0060194 A1* | 3/2010 | Furry | H05B 33/0803 | 315/294 |
| 2010/0216343 A1* | 8/2010 | Buschnakowski | G01D 21/00 | 439/620.01 |
| 2010/0235619 A1* | 9/2010 | Inoue | H04L 63/0428 | 713/151 |
| 2010/0235639 A1* | 9/2010 | Inoue | G06F 1/3203 | 713/168 |
| 2011/0103240 A1* | 5/2011 | Taghavi Nasrabadi | H04W 72/085 | 370/252 |
| 2011/0214157 A1* | 9/2011 | Korsunsky | G06F 21/55 | 726/1 |
| 2013/0198546 A1* | 8/2013 | Fujisawa | G06F 1/3234 | 713/323 |
| 2014/0164807 A1* | 6/2014 | Okazawa | G06F 1/3209 | 713/323 |
| 2014/0310392 A1* | 10/2014 | Ho | H04L 69/16 | 709/223 |
| 2016/0205069 A1* | 7/2016 | Blocher | H04L 63/02 | 726/12 |
| 2016/0308885 A1* | 10/2016 | McDougal | H04L 63/0281 | |

* cited by examiner

DEVICE INTERFACING

BACKGROUND

Many devices, such as network switches, data storage controllers, industrial controllers, etc., may have communication interfaces such as a serial interface (e.g., an RS232 serial connection). A device may be manufactured with a set of features and/or configuration (e.g., network configuration information), which may be later enabled and/or tailored to a particular environment, within which the device is to be deployed, by connecting an administrator computer, such as a laptop, to a serial interface of the device. Connecting the administrator computer, hosting device configuration software, to individual devices for manual configuration may be cumbersome and/or time consuming for an administrator. Accordingly, a cost effective, efficient, and automated way to configure devices may be advantageous.

SUMMARY

In accordance with the present disclosure, one or more systems and/or methods for interfacing with a device are provided. A device interfacing component (e.g., a microprocessor integrated into an interface cable such as a serial cable) may comprise a target device interface operatively coupled to a target device over a target device communication connection (e.g., the device interfacing component may comprise a serial port connected by a serial cable to a target device serial port of the target device). The target device interface may be configured to receive a data stream from the target device (e.g., a string of characters corresponding to a feature enablement and/or configuration command line interface application of the target device).

The device interfacing component may comprise a matching component. The matching component may be configured to identify a string from the data stream (e.g., the command line interface application may output "F5 for RAID configuration"). The matching component may compare the string to a set of expressions associated with a set of scripted responses (e.g., an expression "F5 for RAID configuration" may be associated with a raid configuration scripted response "F5, wait 20 seconds, enter key, escape key, enter key" used to enable a RAID configuration for the target device). Responsive to identifying a match between the string and an expression, a scripted response associated with the expression may be identified, such as the raid configuration scripted response. The matching component may execute the scripted response to send a response instruction (an F5 key command, an enter key command after 20 seconds, an escape key command, and an enter key command) over the target device communication connection to the target device.

The device interfacing component may comprise a computing device interface operatively coupled to a computing device over a computing device communication connection (e.g., a universal serial bus (USB) connection to an administrator laptop). The device interfacing component may send the data stream to the computing device. In an example, the computing device interface may receive a matching component configuration instruction from the computing device. The matching component configuration instruction may be implemented to create, remove, or modify expressions and/or scripted responses.

In an example, a plurality of device interfacing components, connected to target devices, may be connected according to a daisy chain configuration. The computing device may send an access request, through the daisy chain to a particular target device, to access a data stream of that target device. The computing device may send a propagation request, through the daisy chain to a particular target device, to implement a matching component configuration instruction for that particular target device.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
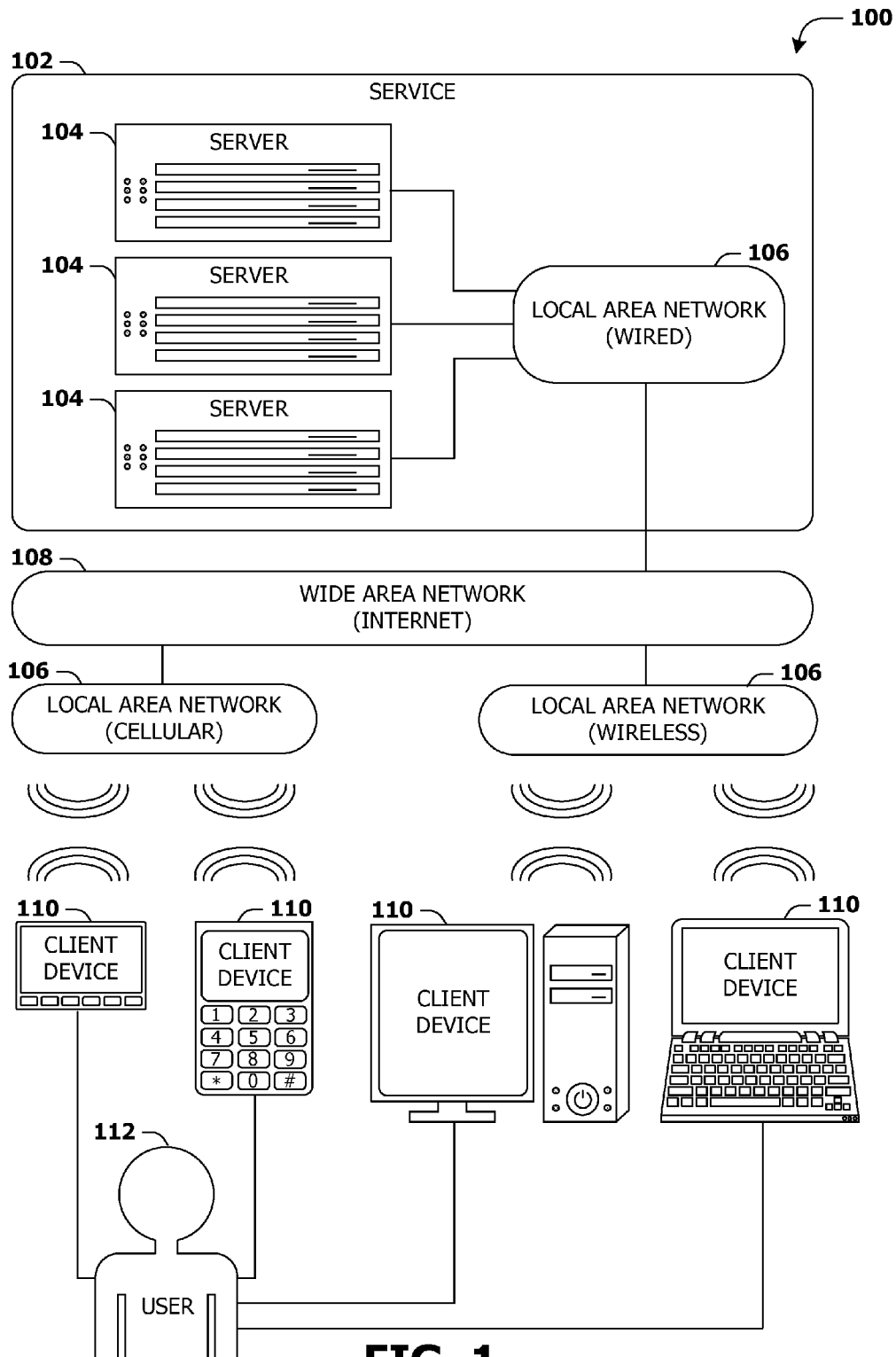
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fibre Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi network or a Bluetooth personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
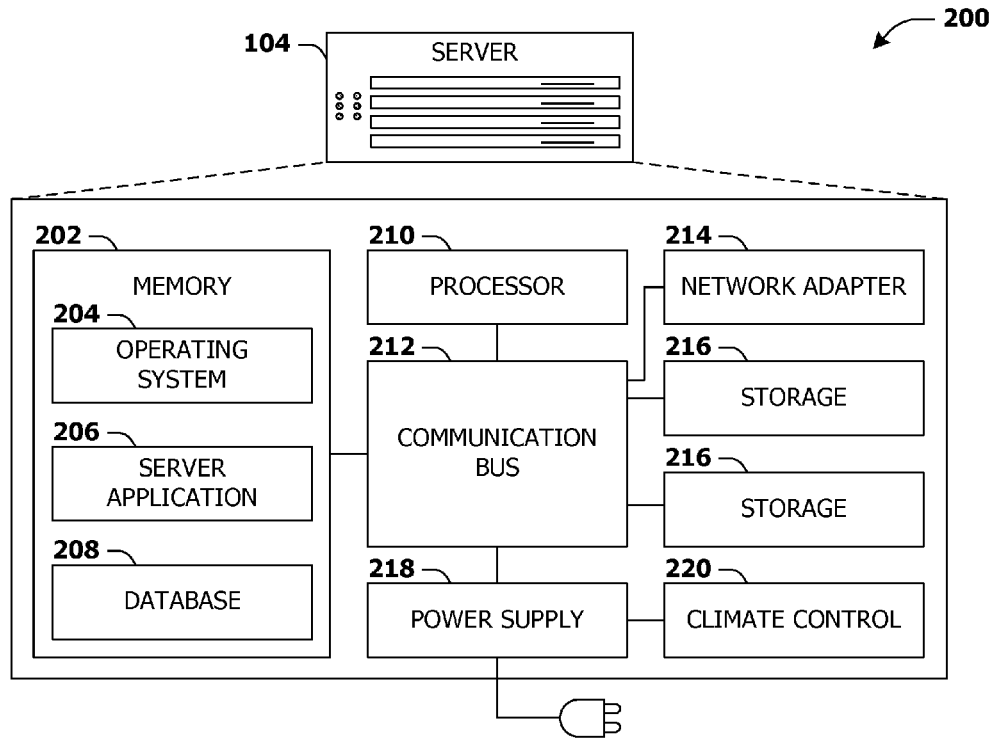
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
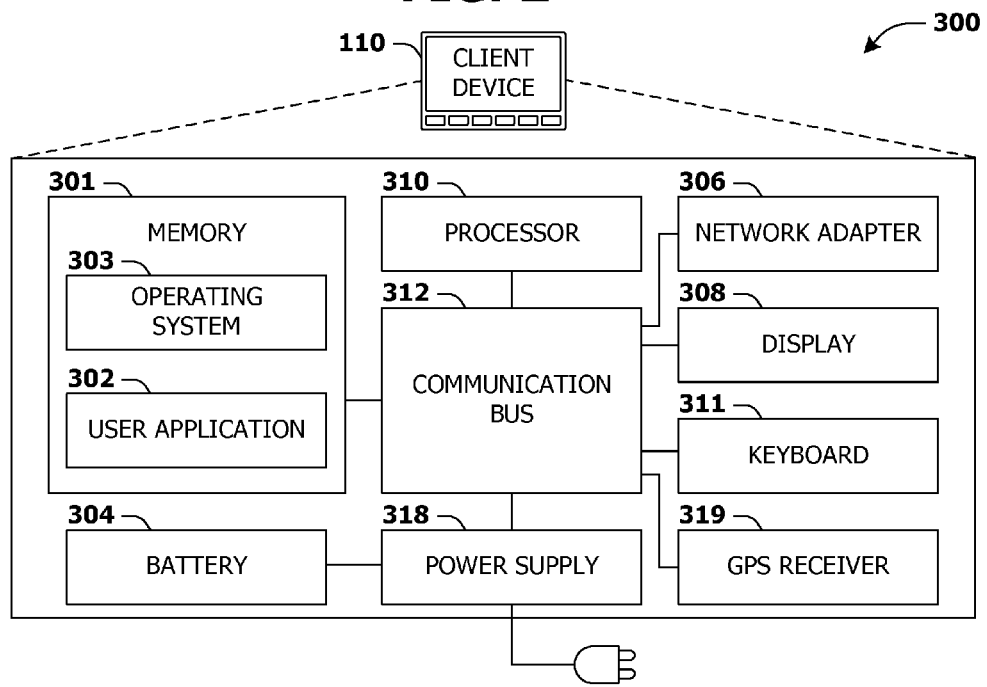
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more systems and/or techniques for interfacing with a device are provided. Many devices, such as network switches, network routers, storage controllers, manufacturing and industrial devices, etc., may expose access for enablement/disablement of features and/or configuration through an interface, such as a serial interface. Connecting a computing device, such as an administrator laptop, to individual devices so that a user may manually configure and/or access features of the device using a software application hosted on the administrator laptop may be cumbersome and time consuming. Accordingly, as provided herein, a device interfacing component (e.g., a microcontroller integrated into or configured to couple to an interface cable such as a serial cable) is configured to couple to a device for automated enablement/disablement of features and/or configuration of the device using automated execution of predefined scripts. A plurality of device interfacing components, connected to a plurality of target devices, may be daisy chained together so that configuration instructions may be propagated to multiple device interfacing components and/or target devices, and that data streams from target devices may be passed through the daisy chain of device interfacing components to a computing device such as an administrator laptop for management of multiple devices from a single computing device.

Figure 4A:
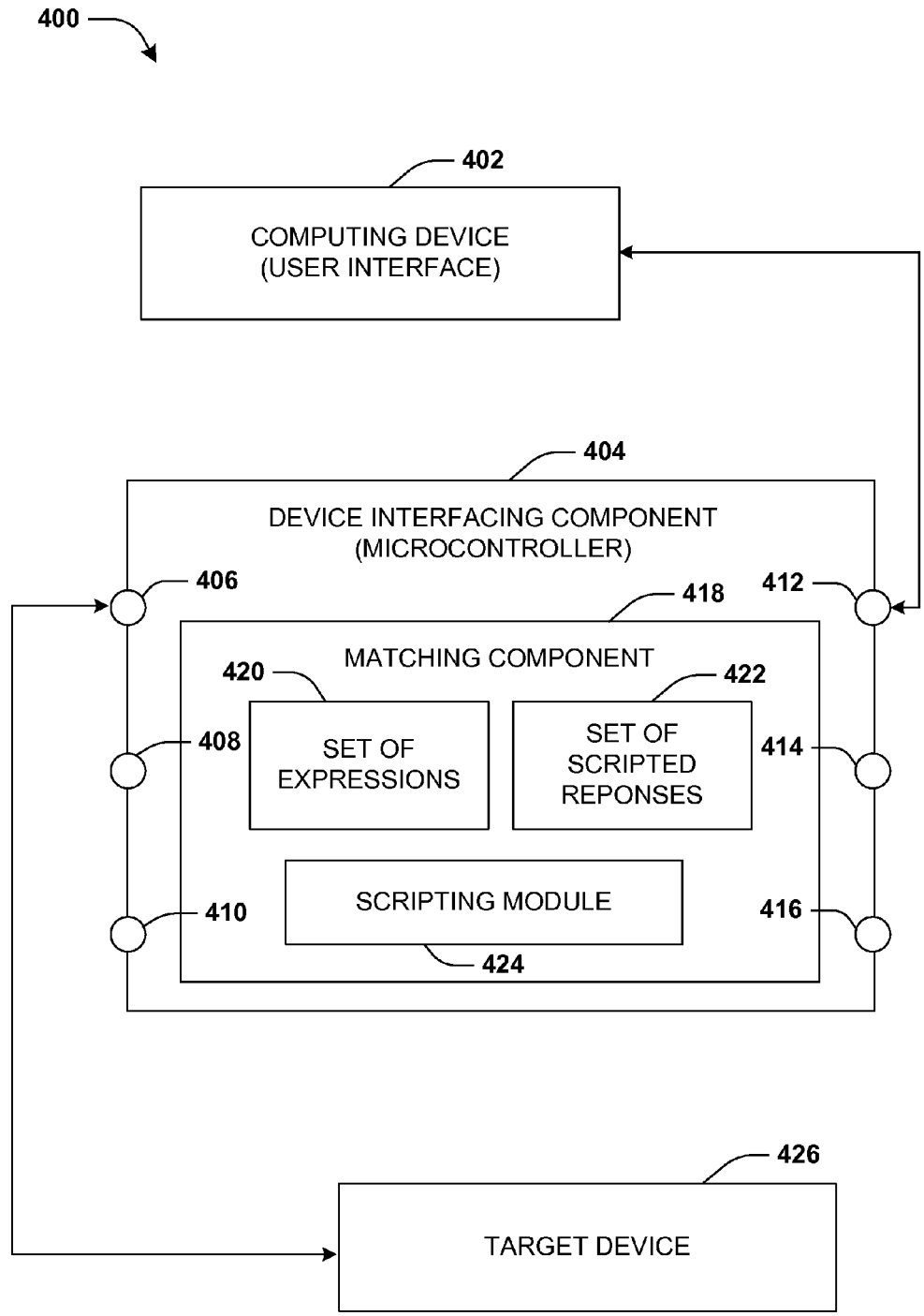
FIG. 4A is a component block diagram illustrating an example system for interfacing with a device.
Figure 4B:
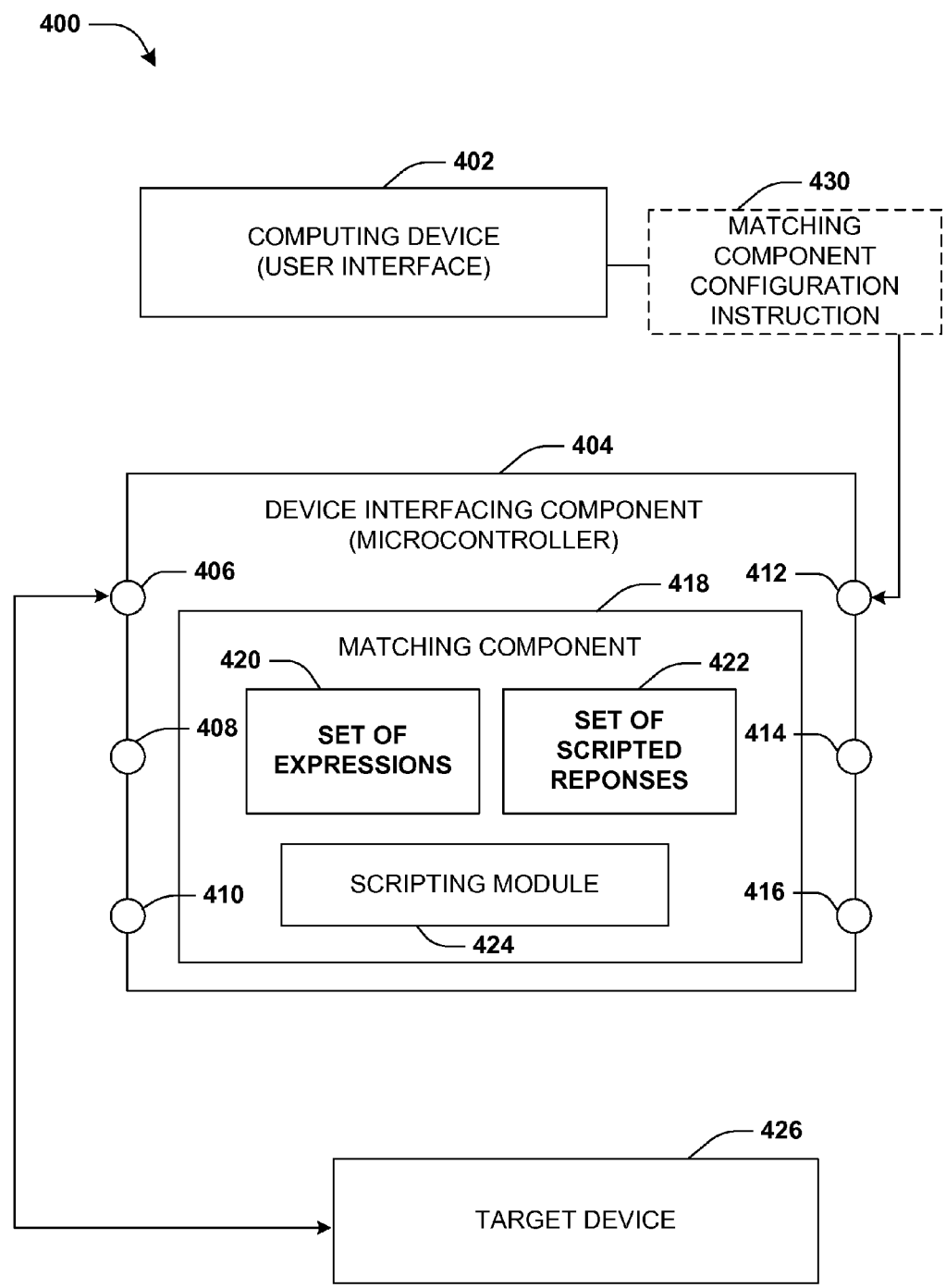
FIG. 4B is a component block diagram illustrating an example system for interfacing with a device, where a matching component configuration instruction is provided to a device interfacing component.

FIGS. 4A-4D illustrate examples of a system 400, comprising a device interfacing component 404, for interface with a device. The device interfacing component 404 (e.g., a standalone component, a microcontroller integrated into an interface cable such as a serial cable, etc.) may comprise a computing device interface 412 operatively coupled to a computing device 402 over a computing device communication connection (e.g., an administrator computer comprising a user interface through which data streams from a target device 426 are displayed and instructions are input and sent to the device interfacing component 404). The computing device interface 412 may be configured to receive a matching component configuration instruction 430 from the computing device 402 over the computing device communication connection, as illustrated in FIG. 4B. The matching component configuration instruction 430 may comprise instructions to create, remove, and/or modify expressions within a set of expression 420 and/or scripted responses within a set of scripted responses 422 used by a matching component 418, of the device interfacing component 404, for sending response instructions to the target device 426 for enabling/disabling features and/or configuring the target device 426. In an example, the matching component configuration instruction 430 may create a new expression "F6 to enable temperature monitoring" and a new scripted response (F6, wait 10 seconds, right arrow, enter key) for the new expression, such that the new scripted response may be executed by the matching component 418 to send a response instruction to the target device 426 based upon a string of a data stream from the target device 426 matching the new expression.

Figure 4C:
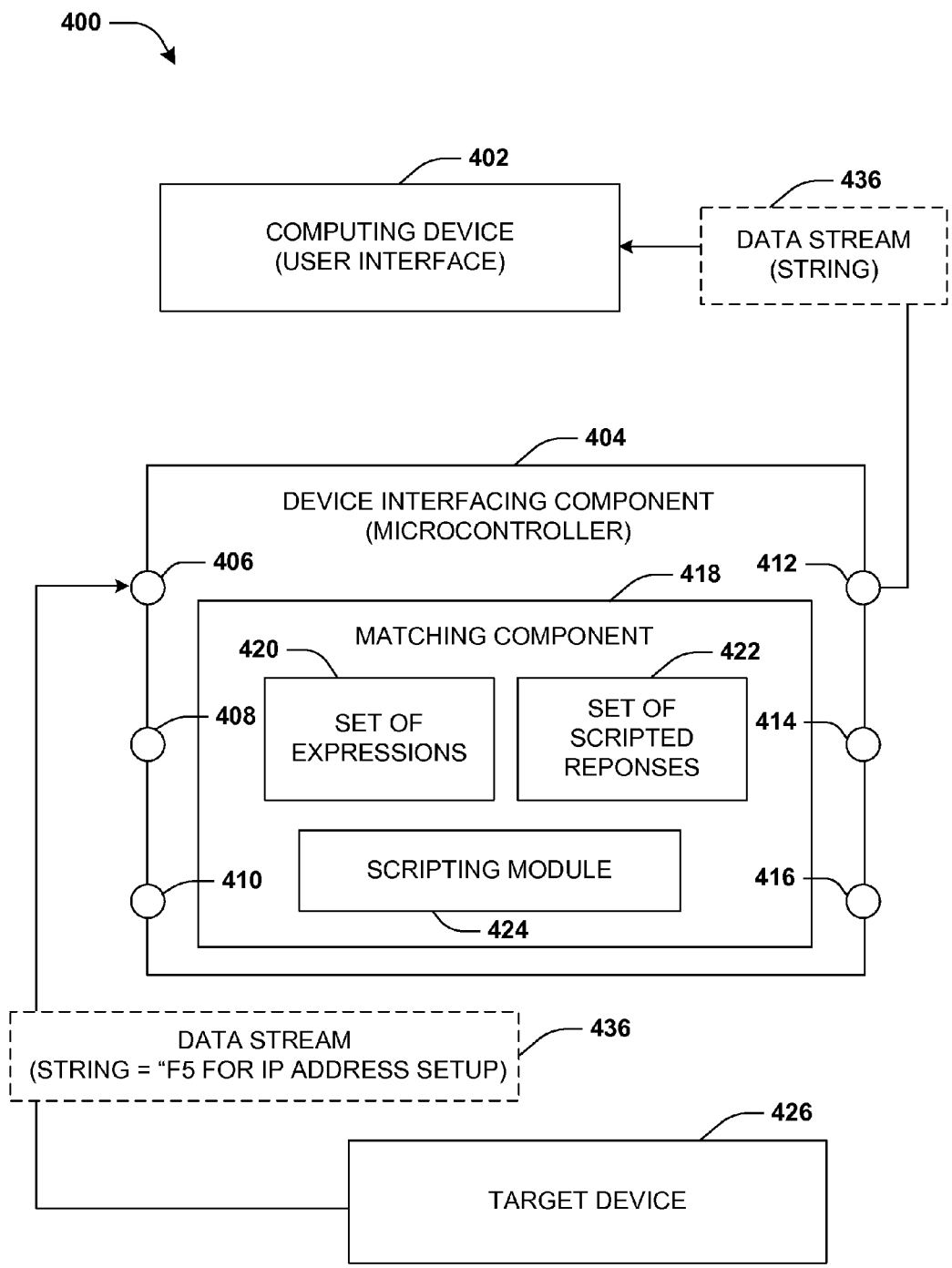
FIG. 4C is a component block diagram illustrating an example system for interfacing with a device, where a data stream is received from a target device.

The device interfacing component 404 may comprise a target device interface 406 operatively coupled to the target device 426 over a target device communication connection (e.g., a serial connection, an intelligent platform management interface, or any other wired or wireless communication connection). The target device interface 406 may be configured to receive a data stream 436 from the target device 426, as illustrated in FIG. 4C. In an example, the device interfacing component 404 may operate as a passthrough device, such that the data stream 436 is passed through the device interfacing component 404 and the computing device interface 412 to the computing device 402, such as for display through the user interface.

Figure 4D:
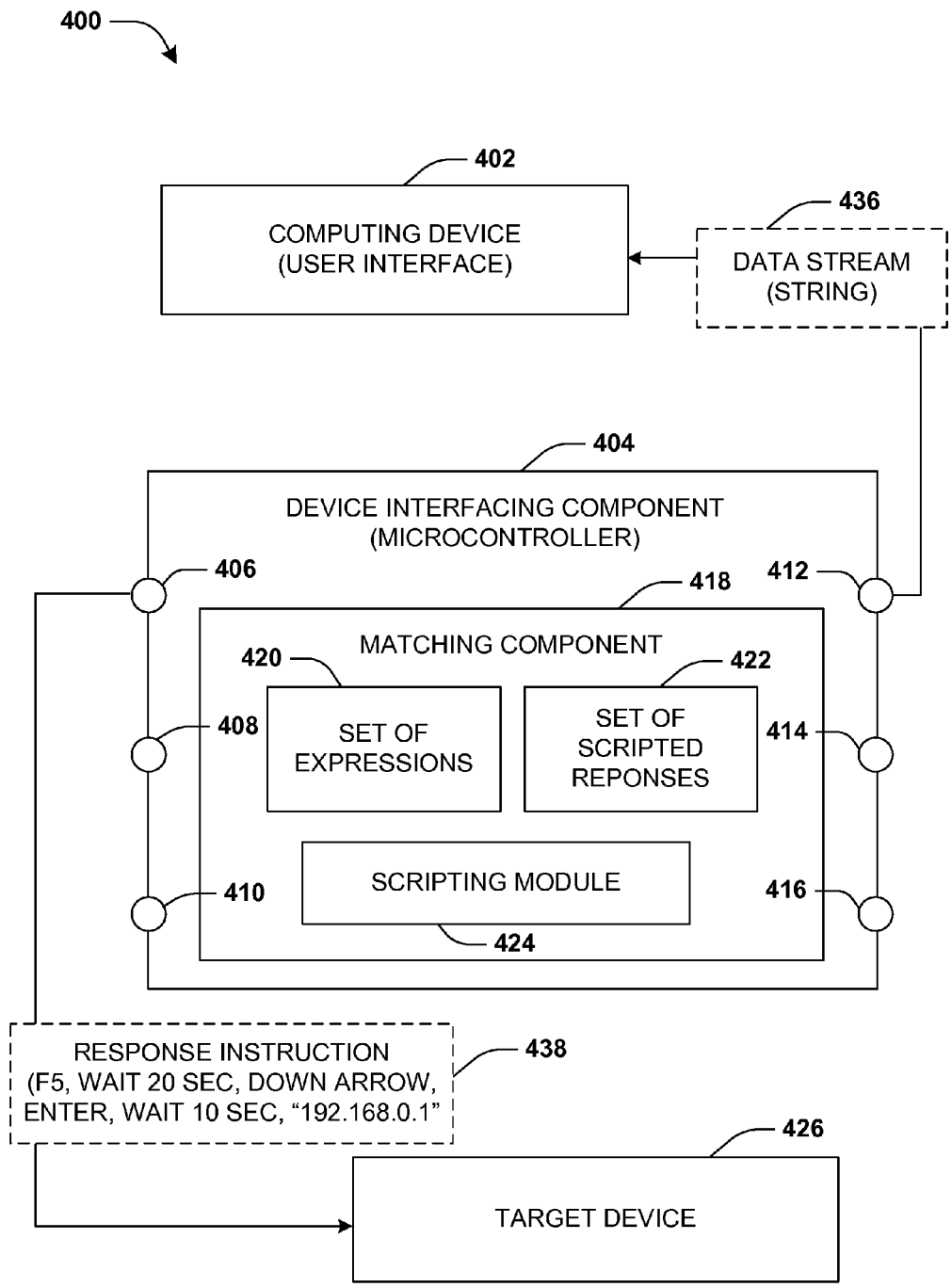
FIG. 4D is a component block diagram illustrating an example system for interfacing with a device, where a response instruction is provided to a target device.

The matching component 418 may be configured to identify a string from the data stream 436, such as a string "F5 for IP address setup". The matching component 418 may compare the string to the set of expressions 420. Responsive to identifying a match between the string and an expression (e.g., the string "F5 for IP address setup" may match an expression "F5 for IP address setup" or may exceed a threshold similarity with an expression "Press F5 for IP address configuration" and thus may be determined as a match), the matching component 418 may identify, from the set of scripted responses 422, a scripted response associated with the expression such as a pre-defined script (F5, wait 20 seconds, down arrow, enter key, wait 10 seconds, "192.168.0.1"). The scripted response may comprise a pause, a character input, a key command input, or any other input recognizable by the target device 426. The scripted response may invoke a configuration command for the target device 426 (e.g., an IP address configuration) and/or an enablement or disablement of a feature of the target device 426 (e.g., enablement of network access). The matching component 418 may execute the scripted response to send a response instruction 438 over the target device communication connection to the target device 426, as illustrated in FIG. 4D. For example, the matching component 418 may comprise a scripting module 424 (e.g., a script execution engine) configured to automatically execute the pre-defined script to implement the scripted response.

In an example, the device interfacing component 404 may be daisy chained with a plurality of device interfacing components utilizing a passthrough interface, such as an input passthrough interface 408 and an output passthrough interface 414 and/or a configuration propagation interface, such as an input configuration propagation interface 410 and an output configuration propagation interface 416. In an example, the device interfacing component 404 may comprise a hybrid interface, not illustrated, corresponding to a single interface (e.g., a single input interface and a single output interface, a single bi-directional interface, etc.) used as the passthrough interface and the configuration propagation interface.

In an example, the passthrough interface (e.g., or the hybrid interface) may operatively couple the device interfacing component 404, according to a daisy chain configuration, to a second device interfacing component connected to a second target device (e.g., the input passthrough interface 408 may be connected to a second output passthrough interface of the second device interfacing component). The passthrough interface may be configured to receive a second data stream, obtained by these second device interfacing component from the second target device, from the second device interfacing component. The passthrough interface may provide the second data stream through the computing device interface 412 to the computing device 402 such as for display through the user interface. In an example, the passthrough interface may provide the second data stream to the computing device 402 based upon an access request received from the computing device 402.

In an example, the configuration propagation interface (e.g., or the hybrid interface) may operatively couple the device interfacing component 404, according to the daisy chain configuration, to the second device interfacing component connected to the second target device (e.g., the output configuration propagation interface 416 may be connected to a second input configuration propagation interface of the second device interfacing component). The configuration propagation interface may be configured to propagate a matching component configuration instruction (e.g., the matching component configuration instruction 430 implemented by the device interfacing component 404, as illustrated in FIG. 4B) to the second device interfacing component for implementation. In an example, the configuration propagation interface may propagate the matching component configuration instruction based upon a propagation request received from the computing device 402.

Figure 5A:
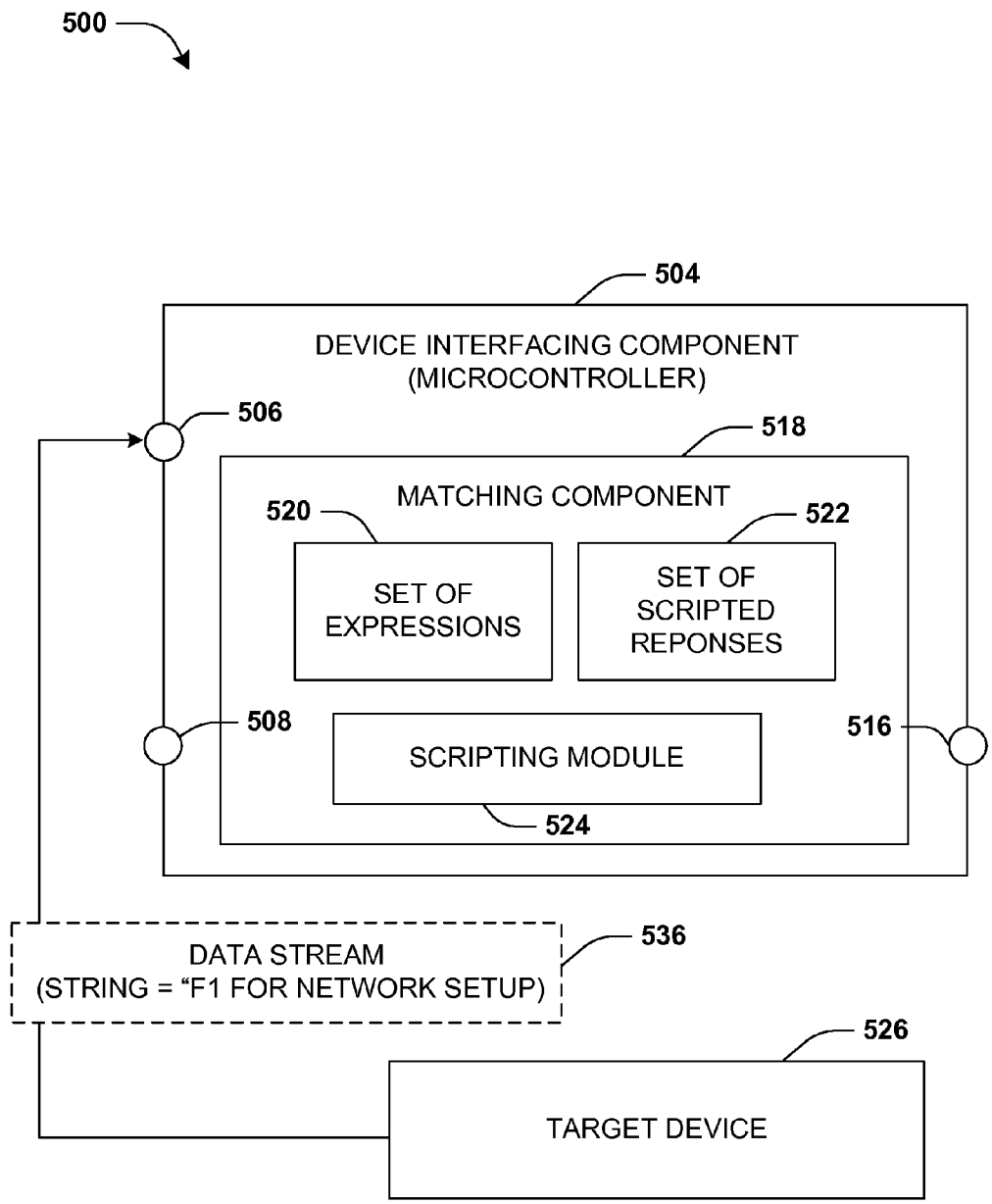
FIG. 5A is a component block diagram illustrating an example system for interfacing with a device, where a data stream is received from a target device.
Figure 5B:
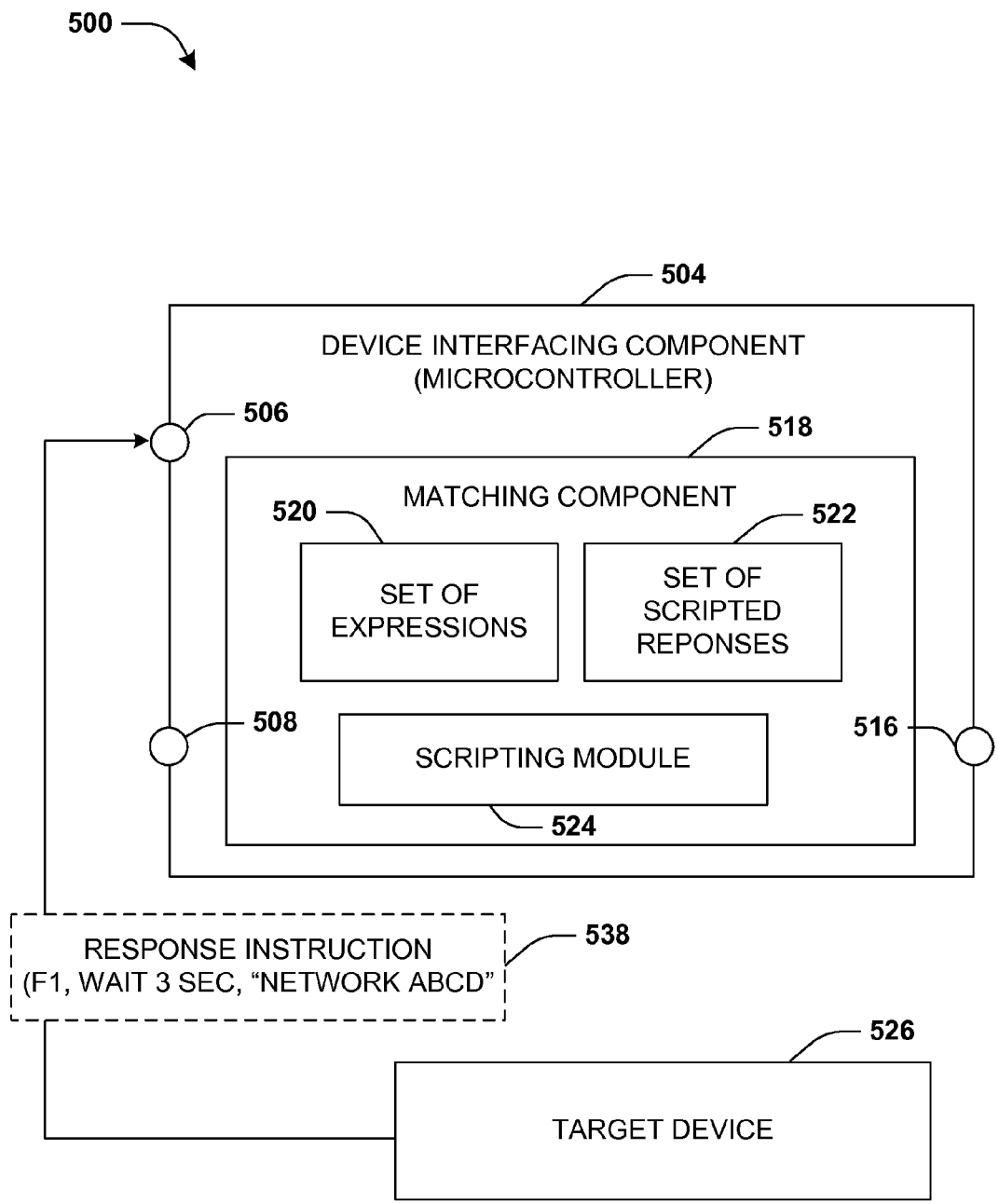
FIG. 5B is a component block diagram illustrating an example system for interfacing with a device, where a response instruction is provided to a target device.

FIGS. 5A-5B illustrate examples of a system 500, comprising a device interfacing component 504, for interfacing with a device. The device interfacing component 504 may comprise a matching component 518 configured to automatically listen for data streams, from a target device 526 over a target device communication connection coupling the target device 526 to a target device interface 506 of the device interfacing component 504, so that automated configuration and/or enablement/disablement of features of the target device 526 may be performed by the matching component 518 using pre-defined scripts.

In an example, a data stream 536 may be received from the target device 526, as illustrated in FIG. 5A. The matching component 518 may identify a string from the data stream 536, such as a string "F1 for network setup". The matching component 518 may compare the string to a set of expressions 520. Responsive to identifying a match between the string and an expression (e.g., the string "F1 for network setup" may match an expression "F1 for network setup" or may exceeding a threshold similarly with an expression "Press F1 for networking setup" and thus may be determined as a match), the matching component 518 may identify, from a set of scripted responses 522, a scripted response associated with the expression such as a pre-defined script (F1, wait 3 seconds, "Network ABCD"). The matching component may execute the scripted response to send a response instruction 538 over the target device communication connection to the target device 526, as illustrated in FIG. 5B. For example, the matching component 518 may comprise a scripting module 524 (e.g., a script execution engine) configured to automatically execute the pre-defined script to implement the scripted response. In this way, the target device 526 may be automatically configured, such as network configuration, without manual intervention and/or costly equipment such as computers or custom hardware (e.g., merely a microcontroller with a target device interface, such as a serial port or cable, may be implemented as the device interfacing component 504).

In an example, the device interfacing component 504 may comprise a hybrid interface (e.g., an input hybrid interface 508, an output hybrid interface 516, or a bidirectional hybrid interface). Data streams may be passed from a second device interfacing component, through the hybrid interface and the device interfacing component 504, to a computing device (not illustrated). Matching component configuration instructions may be propagated from the computing device, through the device interfacing component 504 and the hybrid interface, to the second device interfacing component for implementation.

Figure 6:
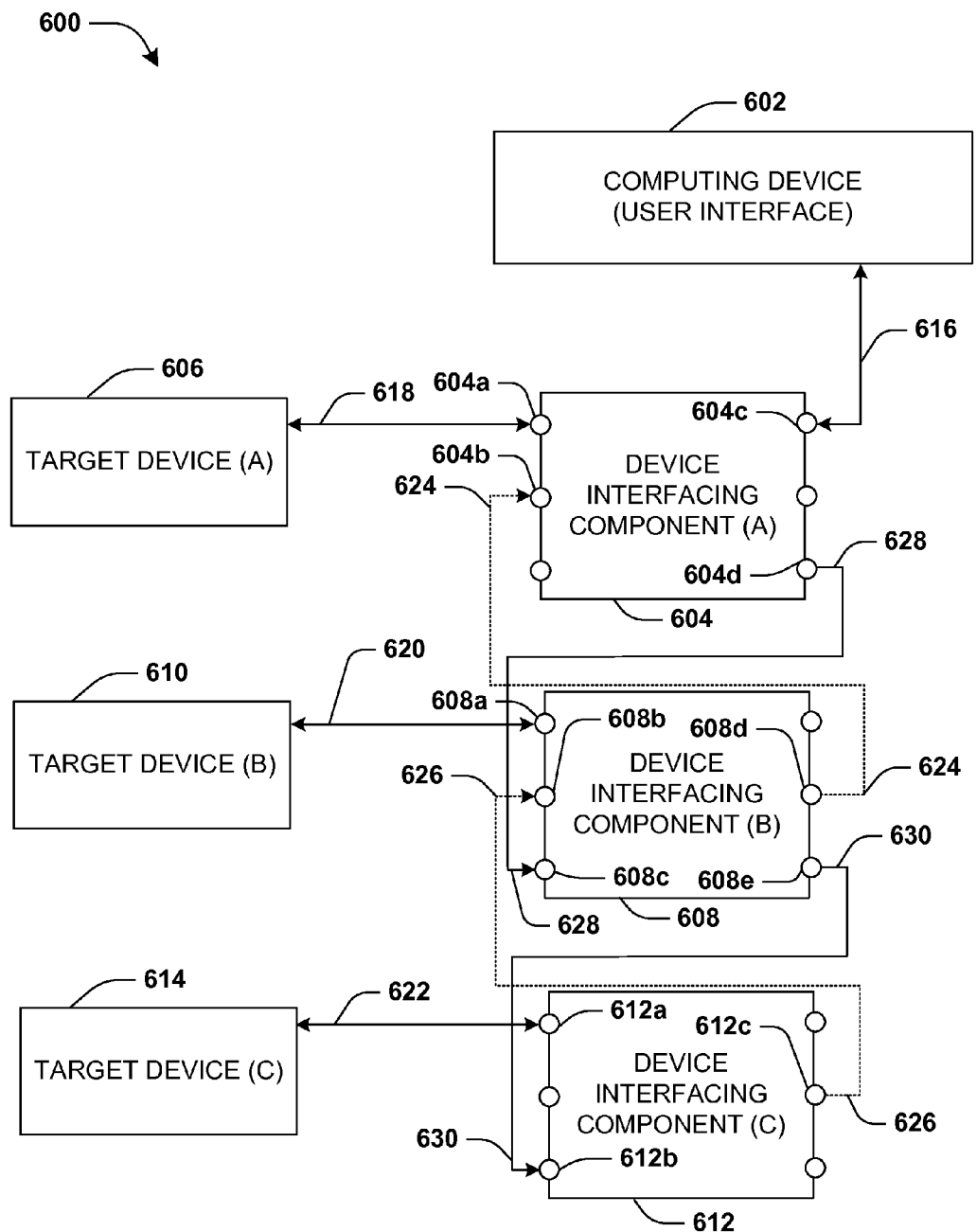
FIG. 6 is a component block diagram illustrating an example system for interfacing with a device, where a plurality of device interfacing components are daisy chained together.

FIG. 6 illustrates an example of a system 600 comprising a plurality of device interfacing components connected according to a daisy chain configuration. The system 600 may comprise a device interfacing component (A) 604, a device interfacing component (B) 608, a device interfacing component (C) 612, and/or other device interfacing components. The device interfacing component (A) 604 may be connected to a target device (A) 606 over a first target device communication connection 618 coupling the target device (A) 606 to a target device (A) interface 604*a* of the device interfacing component (A) 604. The device interfacing component (B) 608 may be connected to a target device (B) 610 over a second target device communication connection 620 coupling the target device (B) 610 to a target device (B) interface 608*a* of the device interfacing component (B) 608. The device interfacing component (C) 612 may be connected to a target device (C) 614 over a third target device communication connection 622 coupling the target device (C) 614 to a target device (C) interface 612*a* of the device interfacing component (C) 612. The device interfacing components may receive data streams from and/or send response instructions to target devices over the target device communication connections.

The device interfacing component (A) 604 may be connected to a computing device 602 over a computing device communication connection 616 coupling the computing device 602 to a computing device interface 604*c* of the device interfacing component (A) 604. The computing device 602 may receive data streams from the device interfacing components over the computing device communication connection 616. The computing device 602 may send matching component configuration instructions to device interfacing components over the computing device communication connection 616.

Device interfacing components may be daisy chained by passthrough communication connections and/or configuration propagation communication connections (or hybrid communication connections between hybrid interfaces). In an example of passthrough communication, the device interfacing component (A) 604 may be daisy chained to the device interfacing component (B) 608 by a first passthrough communication connection 624 connecting an input passthrough interface (A) 604*b* of the device interfacing component (A) 604 to an output passthrough interface (B) 608*d* of the device interfacing component (B) 608. In this way, the device interfacing component (B) 608 may send a data stream, received from the target device (B) 610, through the passthrough communication connection 624 and the device interfacing component (A) 604 to the computing device 602, such as for display through the user interface.

In another example of passthrough communication, the device interfacing component (B) 608 may be daisy chained to the device interfacing component (C) 612 by a second passthrough communication connection 626 connecting an input passthrough interface (B) 608*b* of the device interfacing component (B) 608 to an output passthrough interface (C) 612*c* of the device interfacing component (C) 612. In this way, the device interfacing component (C) 612 may send a data stream, received from the target device (C) 614, through the second passthrough communication connection 626, the device interfacing component (B) 608, the passthrough communication connection 624, and the device interfacing component (A) 604 to the computing device 602, such as for display through the user interface.

In an example of configuration propagation, the device interfacing component (A) 604 may be daisy chained to the device interfacing component (B) 608 by a first configuration propagation communication connection 628 connecting an output configuration propagation interface (A) 604*d* of the device interfacing component (A) 604 to an input configuration propagation interface (B) 608*c* of the device interfacing component (B) 608. In this way, the computing device 602 may propagate matching component configuration instructions (e.g., an instruction to create, remove, or modify an expression and/or a scripted response) through the device interfacing component (A) 604 and the configuration propagation communication connection 628 to the device interfacing component (B) 608 for implementation.

In another example of configuration propagation, the device interfacing component (B) 608 may be daisy chained to the device interfacing component (C) 612 by a second configuration propagation communication connection 630 connecting an output configuration propagation interface (B) 608*e* of the device interfacing component (B) 608 to an input configuration propagation interface (C) 612*b* of the device interfacing component (C) 612. In this way, the computing device 602 may propagate matching component configuration instructions (e.g., an instruction to create, remove, or modify an expression and/or a scripted response) through the device interfacing component (A) 604, the configuration propagation communication connection 628, the device interfacing component (B) 608, and the second configuration propagation communication connection 630 to the device interfacing component (C) 612 for implementation.

Figure 7:
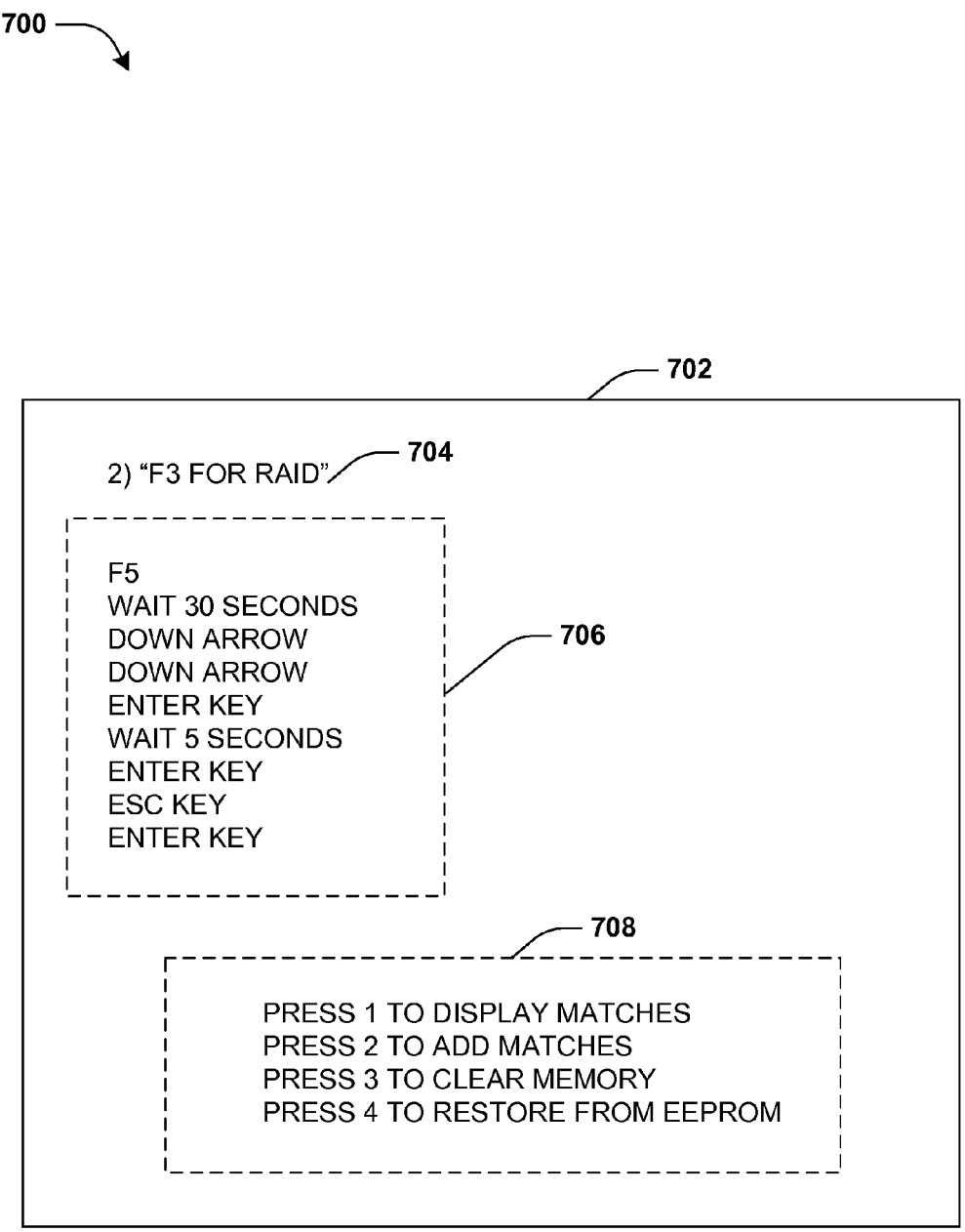
FIG. 7 illustrates an example of a user interface of a computing device coupled to a device interfacing component.

FIG. 7 illustrates an example of a user interface 702 of a computing device connected to a device interfacing component that is coupled to a target device. The user interface 702 may display a string "F3 for RAID" of a data stream received by the device interfacing component from the target device. The user interface 702 may display a scripted response 706 provided by the device interfacing component to the target device as a response instruction (F5, wait 30 seconds, down arrow, down arrow, enter key, wait 5 seconds, enter key, escape key, enter key) based upon the string "F3 for RAID" matching an expression "F3 for RAID" associated with the scripted response. The scripted response 706 may invoke a RAID configuration command for the target device. The user interface 702 may expose a command menu 708 for the device interfacing component. The command menu 708 may be populated with a display match command used to display a set of expressions and/or a set of scripted responses programming into the device interfacing component, an add match command used to create a new expression and/or a new scripted response for the device interfacing component (e.g., a user generated pre-defined script), a clear memory to clear the set of expression and/or the set of scripted responses of the device interfacing component, a restore memory command to restore the set of expression and/or the set of scripted responses to the device interfacing component, and/or other commands such as commands to modify expressions and/or scripted responses.

Figure 8:
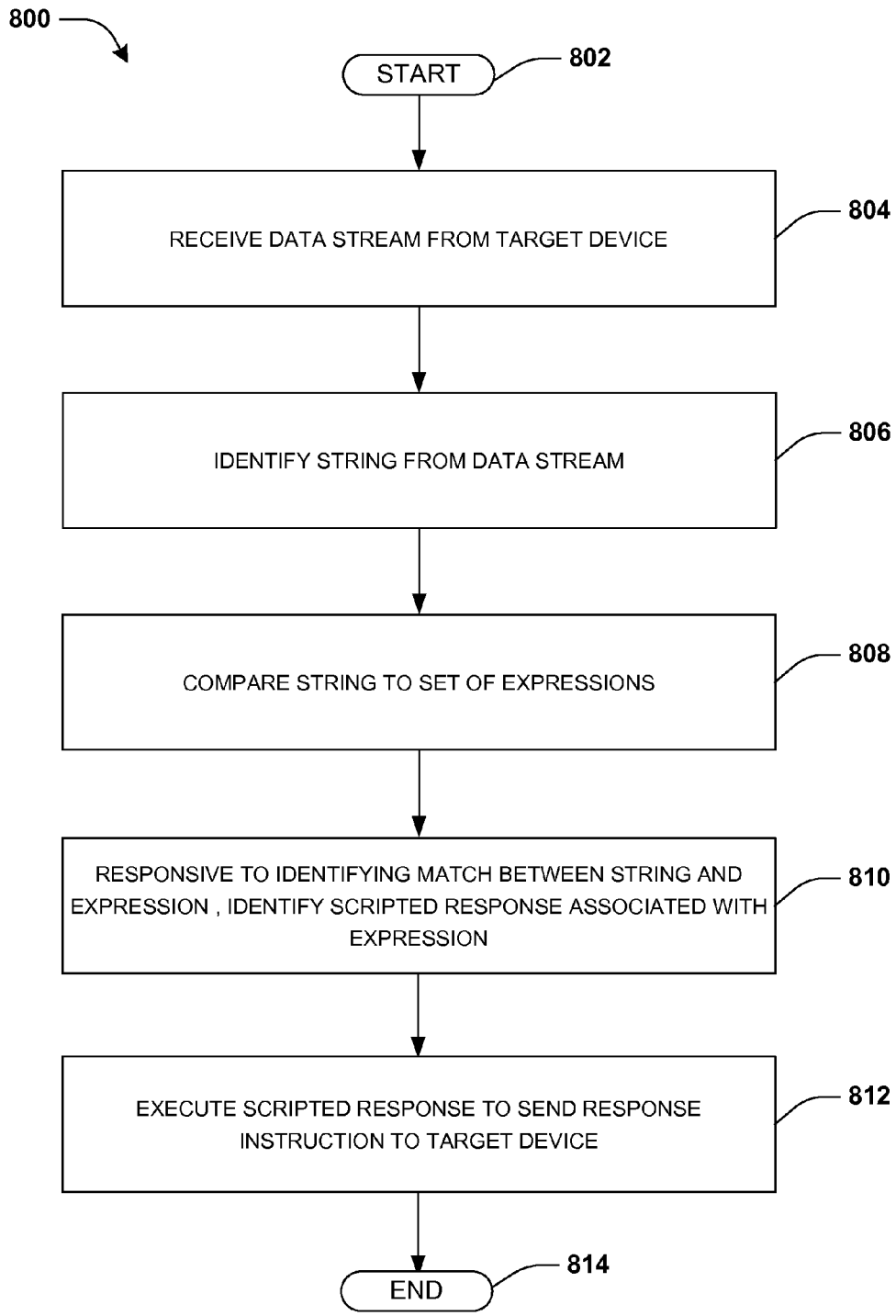
FIG. 8 is a flow chart illustrating an example method of interfacing with a device.

An embodiment of interfacing with a device is illustrated by an example method 800 of FIG. 8. At 802, the method 800 starts. At 804, a data stream may be received over a target device communication connection established between a target device interface of a device interfacing component and a target device. At 806, a string may be identified from the data stream. At 808, the string may be compared to a set of expressions. At 810, responsive to identifying a match between the string and an expression, a scripted response, associated with the expression, may be identified. At 812, the scripted response may be executed to send a response instruction over the target device communication connection to the target device. At 814, the method 800 ends.

Figure 9:
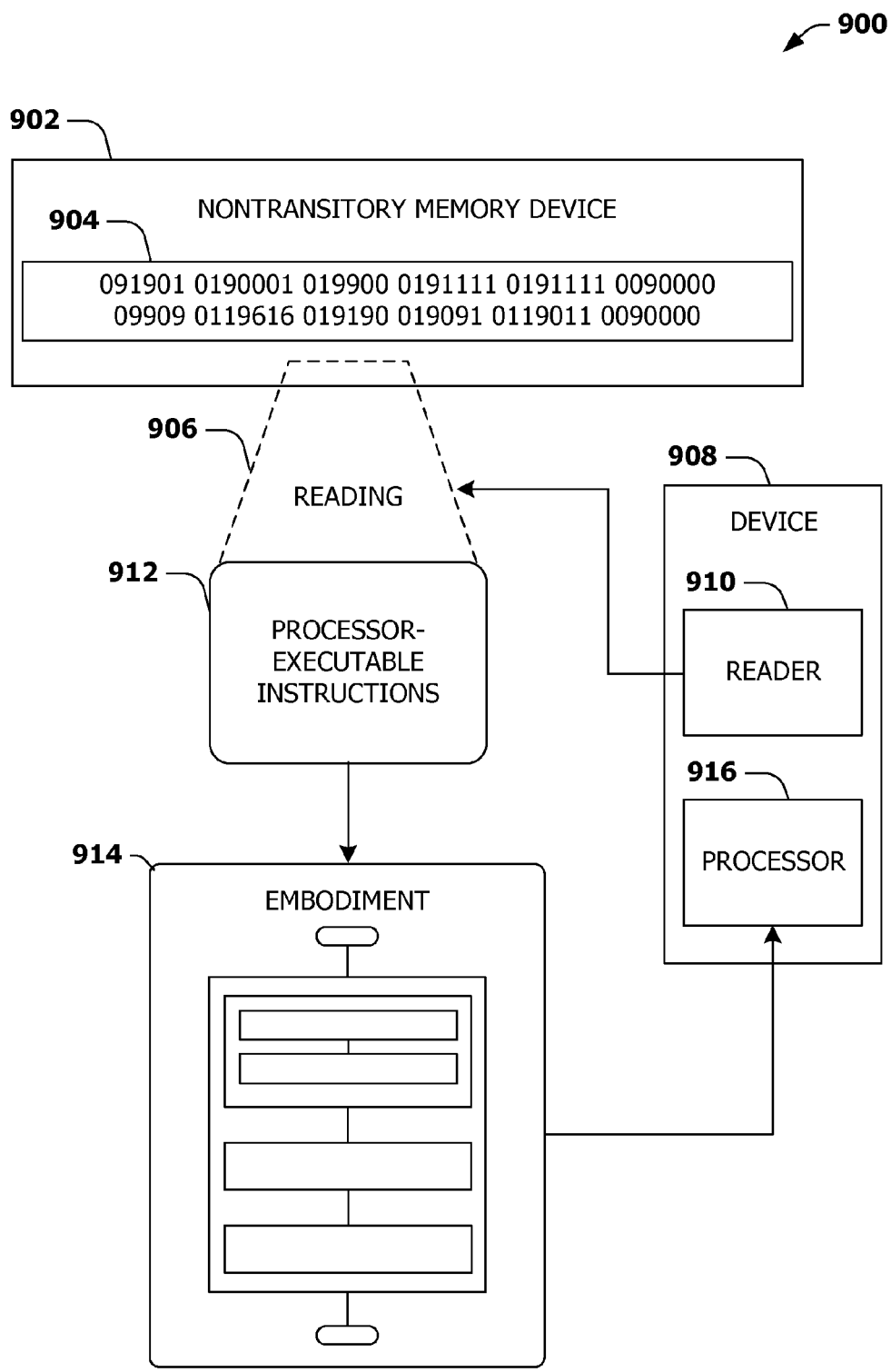
FIG. 9 is an illustration of a scenario featuring an example nontransitory memory device in accordance with one or more of the provisions set forth herein.

FIG. 9 is an illustration of a scenario 900 involving an example nontransitory memory device 902. The nontransitory memory device 902 may comprise instructions that when executed perform at least some of the provisions herein. The nontransitory memory device may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD, DVD, or floppy disk). The example nontransitory memory device 902 stores computer-readable data 904 that, when subjected to reading 906 by a reader 910 of a device 908 (e.g., a read head of a hard disk drive, or a read operation invoked on a solid-state storage device), express processor-executable instructions 912. In some embodiments, the processor-executable instructions, when executed on a processor 916 of the device 908, are configured to perform a method, such as at least some of the example method 800 of FIG. 8, for example. In some embodiments, the processor-executable instructions, when executed on the processor 916 of the device 908, are configured to implement a system, such as at least some of the example system 400 of FIGS. 4A-4D, at least some of the example system 500 of FIGS. 5A-5B, and/or at least some of the example system 600 of FIG. 6, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A system for interfacing with a device, comprising:
a device interfacing component, comprising a microcontroller integrated into an interface cable, comprising:
a computing device interface operatively coupled to a computing device over a computing device communication connection via the interface cable, the computing device interface configured to:
receive a matching component configuration instruction from the computing device over the computing device communication connection; and
implement the matching component configuration instruction to modify a first scripted response for an expression into a second scripted response for the expression, wherein the expression is part of a set of expressions stored on the device interfacing component, wherein the first scripted response is part of a set of scripted responses stored on the device interfacing component and associated with the set of expressions prior to the modifying and the second scripted response is part of the set of scripted response after the modifying;
a target device interface, operatively coupled to a target device different than the computing device over a target device communication connection different than the computing device communication connection via the interface cable, configured to receive a data stream from the target device; and
a matching component configured to:
identify a string from the data stream;
compare the string to the set of expressions;
responsive to identifying a match between the string and the expression, identify the second scripted response as being associated with the expression; and
execute the second scripted response to send a response instruction over the target device communication connection to the target device;
the computing device interface configured to:
send the data stream, comprising the string determined to match the expression of the set of expressions, over the computing device communication connection to the computing device.

2. The system of claim 1, the identifying a match comprising determining that the string exceeds a threshold similarity with the expression.

3. The system of claim 1, the matching component configuration instruction comprising at least one of a create expression instruction, a remove expression instruction, or a modify expression instruction.

4. The system of claim 1, the matching component configuration instruction comprising at least one of a create scripted response instruction, a remove scripted response instruction, or a modify scripted response instruction.

5. The system of claim 1, the target device communication connection comprising at least one of a serial connection or an intelligent platform management interface.

6. The system of claim 1, the
sending the data stream to the computing device comprising operating the device interfacing component as a passthrough device to pass the data stream to the computing device for display on a user interface of the computing device.

7. The system of claim 1, the second scripted response comprising at least one of a pause, a character input, or a key command input.

8. The system of claim 1, the second scripted response corresponding to device input configured to invoke a configuration command for the target device.

9. The system of claim 1, the second scripted response corresponding to device input configured to enable or disable a feature of the target device.

10. The system of claim 1, the microcontroller configured to implement the matching component.

11. The system of claim 1, wherein the interface cable is a serial cable.

12. The system of claim 1, the matching component comprising:
a scripting module configured to automatically execute a pre-defined script to implement the second scripted response based upon the string matching the expression.

13. The system of claim 1, the device interfacing component comprising:
a hybrid interface operatively coupled according to a daisy chain configuration to a second device interfacing component connected to a second target device, the hybrid interface configured to:
receive a second data stream, obtained by the second device interfacing component from the second target device, from the second device interfacing component;
provide the second data stream through a computing device interface to a computing device; and
propagate a matching component configuration instruction, implemented by the device interfacing component, to the second device interfacing component for implementation.

14. The system of claim 1, comprising:
a plurality of device interfacing components operatively coupled together according to a daisy chain configuration, the plurality of device interfacing components comprising the device interfacing component and a second device interfacing component.

15. The system of claim 14, the device interfacing component configured to:
receive a request over a computing device communication connection established between a computing device and a computing device interface of the device interfacing component, the request corresponding to at least one of:
an access request for a second data stream received by the second device interfacing component from a second target device; or
a propagation request to propagate a matching component configuration instruction to the second device interfacing component; and
implement the request for the second device interfacing component.

16. The system of claim 1, the device interfacing component configured to:
expose a command menu for the device interfacing component over the computing device interface to the computing device, the command menu populated with at least one of a display match command, an add match command, a clear memory command, or a restore memory command.

17. A method for interfacing with a device, comprising:
receiving a data stream over a target device communication connection established between a target device interface of a device interfacing component, comprising a microcontroller integrated into an interface cable, and a target device, wherein the target device interface is operatively coupled to the target device via the interface cable;
identifying a string from the data stream;
comparing the string to a set of expressions;
responsive to identifying a match between the string and an expression, identifying a scripted response associated with the expression;
executing the scripted response to send a response instruction over the target device communication connection to the target device; and
sending the data stream, comprising the string determined to match the expression of the set of expressions, over a computing device communication connection different than the target device communication connection to a computing device different than the target device.

18. The method of claim 17, comprising:
receiving a matching component configuration instruction from the computing device over the computing device communication connection; and
implementing the matching component configuration instruction to modify at least one of the set of expressions or a set of scripted responses associated with the set of expressions.

19. A system for interfacing with a device, comprising:
a device interfacing component, comprising a microcontroller integrated into an interface cable, comprising:
  a target device interface operatively coupled to a target device over a target device communication connection via the interface cable, the target device interface configured to receive a data stream from the target device;
  a matching component configured to:
    identify a string from the data stream;
    compare the string to a set of expressions;
    responsive to identifying a match between the string and an expression, identify a scripted response associated with the expression; and
    execute the scripted response to send a response instruction over the target device communication connection to the target device;
  a computing device interface operatively coupled to a computing device different than the target device over a computing device communication connection different than the target device communication connection via the interface cable, the computing device interface configured to:
    send the data stream, comprising the string determined to match the expression of the set of expressions, over the computing device communication connection to the computing device; and
  a hybrid interface operatively coupled according to a daisy chain configuration to a second device interfacing component connected to a second target device, the hybrid interface configured to:
    receive a second data stream, obtained by the second device interfacing component from the second target device, from the second device interfacing component;
    provide the second data stream through a computing device interface to a computing device; and
    propagate a matching component configuration instruction, implemented by the device interfacing component, to the second device interfacing component for implementation.

* * * * *